Patented Nov. 9, 1937

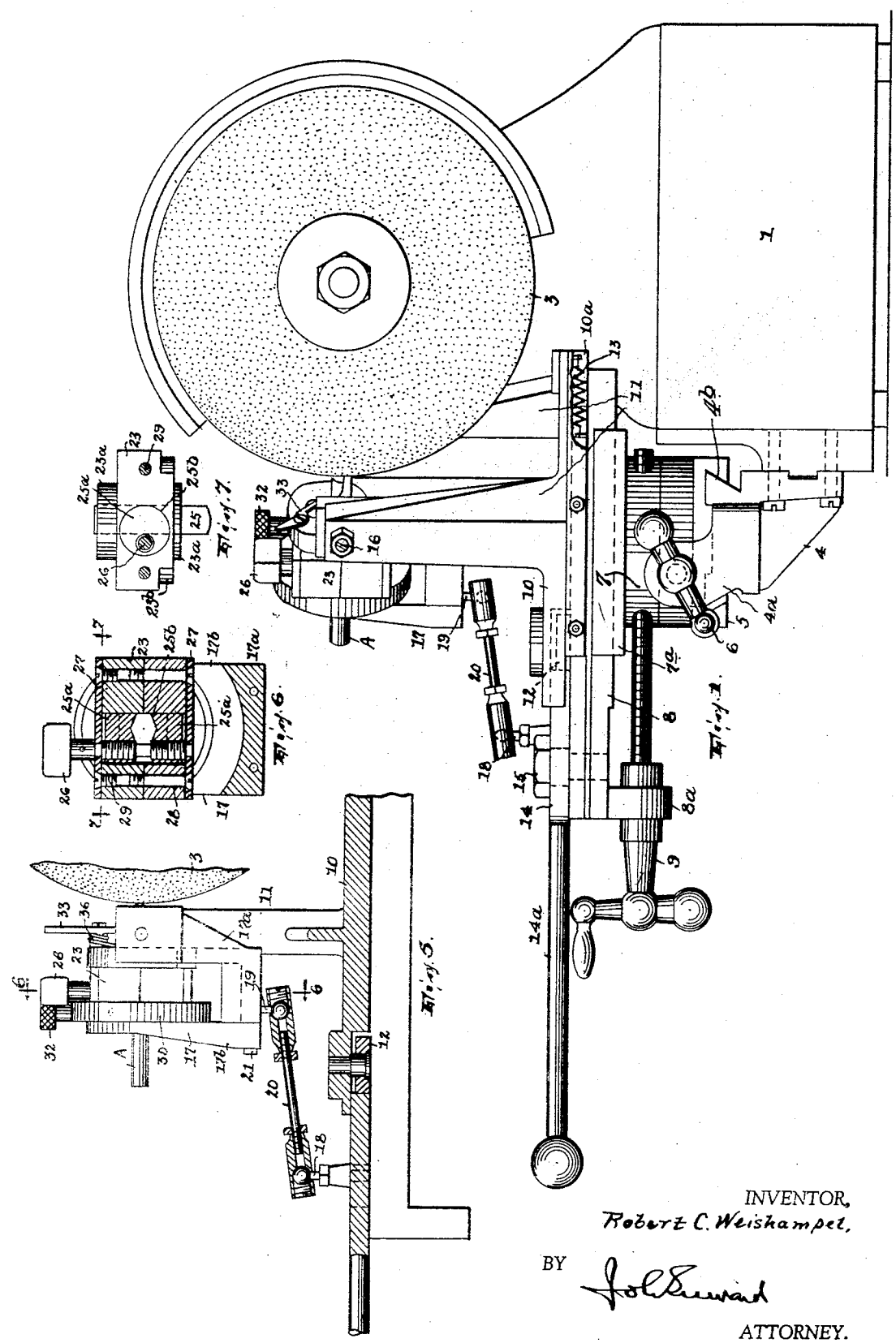

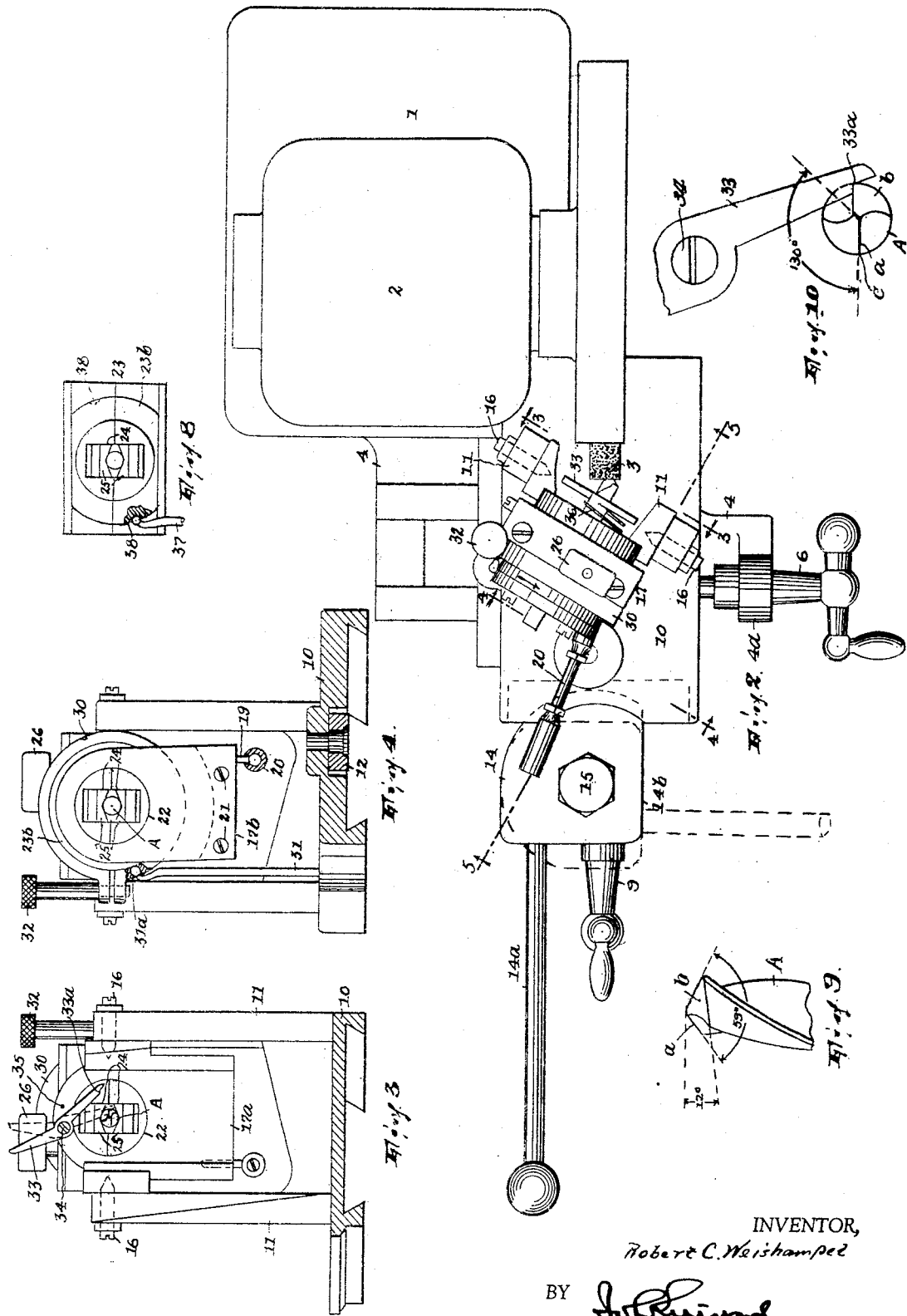

2,098,267

UNITED STATES PATENT OFFICE

2,098,267

DRILL GRINDING MACHINE

Robert C. Weishampel, Paterson, N. J.

Application February 18, 1935, Serial No. 6,925

10 Claims. (Cl. 51—219)

This invention relates to machines for grinding drills and especially twist drills. In my Patent No. 1,989,835 a machine of this class is set forth in which, having a grind-wheel, there are the following instrumentalities: a carrier movable toward the grind-wheel, a cradle pivoted in the carrier to tilt on a substantially horizontal axis suitably oblique to the path of movement of the carrier, and a chuck or tool-holder rotative in the cradle around an axis extending lengthwise of the drill, such movement of the carrier being effected by a manually actuated cam or cam-lever and such movement of the cradle and the rotation of the chuck or tool holder being effected by a lever-like element engaged therewith and coupled with the cam or cam-lever through a link.

According to this invention I simplify the construction and effect in a much more direct, positive and accurate manner the movements of the cradle and chuck. The cradle is connected positively with the cam or cam-lever through merely a link, and the chuck's movement rotatively in the cradle is made an incident of the movement of the latter and is also truly about the axis of the drill, these being factors contributing to the named advantages. Further, according to the invention the construction is such that the operator may with facility and accuracy pre-determine the proper position, rotatively and lengthwise, of the drill in the chuck for the grinding of one of the clearances of the drill, and, without disturbing the adjustment thus effected, may proceed with the grinding of the other clearance, the advantage of which latter is obviously that the two clearances will be ground alike, it being understood that the motions assumed by the chuck and hence by the drill are made to be such that on the grinding each clearance is left in conformity with the standard requirements for effective and accurate cutting by the drill.

In the drawings,

Fig. 1 is a side elevation of the machine;

Fig. 2 is a plan thereof;

Figs. 3, 4, and 5 are sectional views on lines 3—3, 4—4, and 5—5, respectively of Fig. 2;

Figs. 6 and 7 are sectional views on lines 6—6 and 7—7, respectively, of Figs. 5 and 6;

Fig. 8 is a sectional view of a modification relating to the chuck or tool-holder;

Fig. 9 is a fragmentary side elevation of a twist-drill; and

Fig. 10 illustrates the manner of preliminarily adjusting the drill in the chuck.

Let 1 be the base of the machine carrying a motor 2 whose armature shaft has affixed thereto a grind-wheel 3, the base 4b being equipped with a bracket 4 having a horizontal guideway on which is a slide 5 adjustable along the guideway by a screw-device 6 which is swivelled in an arm 4a of the bracket and threaded into the slide; and let 7 be another bracket which is rotatively adjustable on slide 5 around a vertical axis (as in my said patent) and on whose guideway 7a, at right angles to the first guideway, is adjustable a slide 8 by a screw-device 9 swivelled in a depending arm 8a of such slide and threaded into bracket 7. Manipulation of screw-device 6 effects displacement of slide 5 and hence of slide 8 transversely of the periphery of the grind-wheel; manipulation of screw-device 9 effects displacement of slide 8 on slide 5 in a direction toward or from such periphery; and adjustment rotatively of bracket 7 on slide 5 alters the angular relation of said bracket and hence of slide 8 and all it carries to said periphery.

On slide 8 and having a dove-tailed tongue-and-groove connection therewith is slidable a carrier 10 having a pair of standards 11. The carrier has an underneath roller 12 which, by means of a spring 13 housed in an underneath groove of the carrier and connecting the latter and the slide, is held against the cam-surface of an actuator, here in the form of a cam 14 pivoted at 15 on the slide and having a handle 14a. When the cam-device formed by parts 14—14a is turned from the full-line toward the dotted-line position shown in Figs. 1 and 2, in the former of which the tool being ground is held against the periphery of the grind-wheel, the carrier will be retracted to withdraw the tool from the grind-wheel.

So much is substantially the same as in my aforesaid patent.

By means of two set-screws 16 in the standards 11 and arranged in a horizontal line which for the grinding of standard drills will usually be 29½° with respect to the horizontal peripheral profile of the grind-wheel a cradle 17 is supported to rock. The cam-device has an upstanding stud 18 and the cradle a depending stud 19 connected by an adjustable link 20, the connection between the link and each stud being a universal joint. When the carrier is reciprocated by the cam-device the cradle is oscillated; in the movement of the cam-device from the dotted to the full line position shown in Fig. 2 the cradle moves anti-clockwise. This direct and hence positive connection between the cam-device or cam-lever and the cradle is found to be of value in the accurate grinding of drills.

The cradle, as shown in Figs. 3 to 5, is in two parts, the forward part 17a being L-shaped in side elevation and the other part 17b generally flat; such parts are held together by screws 21 and have alined bearing holes 22 in which the tool-holder or chuck is journaled.

The tool-holder or chuck proper is constructed as follows: There is a generally oblong housing 23 having opposite trunnions or bearings 23a fitting the holes 22 of the cradle and also having an oblong hole 24 coaxial with the trunnions and extending through the housing, such hole receiving the two chuck jaws 25 which grip the tool to be ground and are formed with opposed V-shaped grooves to receive the tool. The jaws have opposite cylindrical bosses 25a (Fig. 7) fitting cylindrical sockets 25b in the housing and these bosses have oppositely threaded eccentric bores to receive the oppositely threaded portions of a thumb-screw 26 for moving the jaws together or apart. The housing is divided into two main parts in a plane between and parallel with plates 27 which close the outer ends of the sockets. Screws 28 unite the two main parts and one plate and screws 29 unite the other plate and one such part. The thumb-screw is journaled in the plates and swivelled in one of them.

The tool-holder or chuck is to oscillate around an axis extending lengthwise and preferably around the actual axis of the tool in the rocking of the cradle. For this purpose in the preferred form it embodies a ring 30 on the tool-holder proper, embracing its hub 23b, with which is connected by a universal joint 31a a stem 31 which forms a projection, fixed to and upstanding from the carrier 10. The tool-holder proper is to be rotated within this ring when, having ground one lip of the drill, the other is to be ground, for which purpose the ring is a split-ring and is adapted to be clamped rigidly to the tool-holder proper by a thumb-screw 32. There is on the forward side of the cradle a gage in the form of a pawl 33 pivoted at 34 on an axis parallel with that of the drill and having a notch affording a shoulder 33a to engage a lip of the drill; this device is normally held retracted against a stop 35 by a spring 36.

In the modified form shown in Fig. 8 the ring is omitted. The stem 37, corresponding to stem 31, forms an elastic pawl and it has a ball terminal adapted to engage in either of two notches 38 diametrically located in the chuck hub, so that the latter is in effect a ratchet.

The machine is adapted accurately to grind a twist drill A true to the standard requirements, to wit, so that the cutting edges or lips *a* shall each form one side of what is known as the "center angle" of 130° and form an angle of 59° to each other equally divided by the drill axis as viewed in side elevation and of equal length and so that the "clearance" *b* (or each helicoidal surface rotatively back of *a* lip) shall meet the cylindrical surface of the drill to form an edge which shall be at an angle of 12° with respect to a line perpendicular to the drill axis.

Referring, first, to the construction in which the stem is in effect a flexible pawl and engageable in diametric notches of the ratchet formed by the hub of the chuck (Fig. 8): With the cam-lever projecting toward the observer in Fig. 2 so that the carrier is retracted, the drill is placed between the chuck-jaws with its active end toward the grind-wheel and clamped by manipulating screw 26; but, on the clamping, the gage 33 is moved to bring its shoulder 33a into position to be engaged with the edge *c* of one of the flutes of the drill upon turning the latter in the chuck as shown in Fig. 10, the drill being also set longitudinally so that the surface at the corner of the adjoining clearance *b* formed between the corresponding lip and the cylindrical surface of the drill will be as near as possible flush with the outer or forward face of the gage, whereupon having clamped the drill as thus adjusted, the gage is released.

The drill is now so positioned as to lie in a plane approximately coincident with the horizontal diameter of the grind-wheel and with one cutting edge or lip extending transversely of and parallel with the transverse profile of the wheel's periphery. Having effected adjustment by the screws 6 and 9 so that the active end of the drill will contact with the periphery of the grind-wheel when the carrier is advanced toward the latter the cam-device is shifted toward the full-line position in Fig. 2, the initial effect of which is to bring said cutting edge or lip against the grind-wheel. Thereupon, on the continued movement of the cam-device two other motions affect the drill, to wit, through the medium of link 20 the cradle and hence the chuck and drill are shifted around the axis of the trunnions 16, so that the drill undergoes tilting to a position in which its active end is elevated, and simultaneously, due to the connection between the stem or pawl 37 and the chuck being eccentric with respect to the drill and also with respect to (back of) said axis of the trunnions and as an incident of such shifting of the chuck and drill, the chuck and hence the drill are rotated around the axis of the drill in the direction of the arrow, Fig. 2. Thus the clearance is ground to a true helicoidal surface, the resultant of the three motions indicated. The first clearance having been thus ground, the operator turns the chuck clockwise in Fig. 8, the pawl or stem slipping from the notch it formerly occupied, until the pawl or stem engages in the other notch, whereupon the hand-lever is again actuated as before to effect a repetition of the described motions.

The mechanism as thus described is found perfectly satisfactory provided the drills to be ground come to the machine formed according to standard, specifically with the terminals of the flutes truly 180° apart. But frequently they are not so, wherefore following the grinding of one clearance the operator would be required, after engaging the pawl with the new notch, to release the drill and carefully re-adjust it with the aid of the gage—which of course entails delay and the possibility of a mal-adjustment of the tool being effected. Hence the preferred construction shown and first described. In this case the drill is not loosened in the chuck until both clearances have been ground. Having, with the use of the gage, adjusted the drill in the chuck for the grinding of the first clearance and having completed such grinding, the operator simply loosens the screw 32 to free the split-ring and then turns the chuck proper in the ring until, with the gage in gaging position, the second flute engages the gage, which may involve a rotation of the chuck proper and hence the drill more or less than 180°, whereupon the ring is again clamped to the chuck proper. In short, in this case the chuck proper and tool remain in effect a unit until the entire grinding operation is completed, the part of the chuck (to wit the ring) with which the stem is connected being releasable from the remaining part or chuck proper to permit the rotation of the latter to whatever extent is required depending on the rotative spacing of the drill flutes where they adjoin the clearances.

Given a movable carrier, a cradle pivoted therein and a tool-holder pivoted in the cradle, in my aforesaid patent the tool-holder was pivoted in the cradle on an axis offset from that of the tool being ground, whereas in the present instance the tool-holder is pivoted in the cradle on an axis coincident with that of the tool and crossing the axis of the cradle.

In said patent the device for moving the carrier and the tool-carrying structure comprising the cradle and tool-holder was connected to said structure through a train of parts acting cam-fashion on such structure. In the present instance there is a simple link (20) connecting said device and structure, wherefore the operation is attended with less lost-motion, or is more positive and hence more conducive to accuracy in grinding.

There are similar advantages in respect to the use of the stem 31 or 37 which in effect constitutes means, coupling an eccentric part of the tool-holder with a part (in the example, actually the carrier) of the means which supports the cradle in which the tool-holder is rotative on an axis transverse of the pivoting axis of the cradle, to oppose displacement of such point relatively to the first means when the cradle is moved pivotally.

Further, according to my invention, having a tool provided with circumferentially offset clearances or other end surfaces to be ground and correspondingly offset shoulders, as the drill flutes, the tool is primarily rotatively adjusted in a tool-holder (having means thereupon to hold the tool against rotation) with reference to a gage, as 33, movable on the supporting means for the tool-holder into position to be engaged by one of said shoulders, and there is releasable coupling means as 37 or the parts 30—31—32, connecting the tool-holder and supporting means, resisting rotation of the tool-holder in response to the influence of the grinding element on the tool.

The described machine may be summarized as involving the combination of the following elements or subcombinations thereof. The operating lever or actuator 14 or 14a shifts the carrier 10 on the table 8 toward and from the grinder or wheel 3. The cradle 17 is carried wholly on the carrier and pivoted to rock thereon. The chuck 30 is journaled on the cradle to turn on an axis determined by the cutting-edge-angle of the drill, usually 59° to the grinding face of the wheel, while the cradle axis may be about 90° thereto or slanting 31° to the grinding face. The lever throw causes the rocking of the cradle and the turning of the chuck. Such elements broadly are in said patent and determine the type of machine. Herein the cradle-rocking is done by a link connection between lever and cradle arranged to thrust or pull an eccentric or low part of the cradle toward or from the grinder, thus tilting cradle and drill during grinding. Preferably a single link 20 serves this purpose, with positive action, being pivoted directly to actuator and cradle. The chuck turning or oscillating means requires no connection from the lever other than the cradle itself, and consists of a passive member, such as the bar or stem 31, mounted on the carrier and engaging an eccentric point of the chuck to anchor such point against displacement so that the rocking of the cradle with chuck causes the self-turning of the chuck and drill during grinding. The anchor means 31 is such as to maintain a lateral point of the chuck at a given level or distance from the carrier so that the tilting brings about the turning. The chuck is shown mounted on the rocking cradle by circular bearing members 22 on the cradle and 23a on the chuck, surrounding the drill like a trunnion. The reversal of drill after completing one grinding is readily effected by the provision of the concentric collar or ring 30 on the chuck, through which the turning is effected; the chuck body being rotatable on or in the ring for adjustment of drill position; and there being a means, as the thumbpiece 32, to couple the chuck to the ring for grinding, or to release the chuck for rotary adjustment without loosening the drill in the chuck.

Having thus fully described my invention what I claim is:

1. In a drill-grinding machine, the combination of a carrier, a cradle pivoted therein, and a drill-holder movable in the cradle around an axis crossing the pivoting axis of the cradle, said drill-holder having a ratchet surface extending around its axis, and a pawl on the carrier yieldingly held engaged with said ratchet surface.

2. In a drill-grinding machine, the combination of supporting means including a carrier and a support on which the carrier is movable, a cradle pivotally supported on the carrier, a drill-holder supported by the cradle and rotative around an axis crossing the pivoting axis of the cradle, means on the carrier on which the drill-holder is pivoted at an eccentric point of the drill-holder whereby on pivotal movement of the cradle the drill-holder will be rotated around its own axis, means for effecting movement of the carrier on said support including a lever pivoted in one and engaging the other of them, and a link connecting the lever and cradle.

3. A drill grinding machine having a grinder wheel, a supporting table, and a mechanism for presenting the drill to the grinder, of the type comprising in combination a carrier shiftable on the table relatively toward and from the grinder, a cradle carried wholly upon the carrier and pivoted to rock thereon, a chuck adapted to hold the drill and journaled on the cradle to turn on an axis slanting to the grinding face at an angle determined by the cutting-edge-angle of the drill, such cradle and chuck axes being substantially at right angles to each other, an operating lever or actuator mounted on the table, a connection operated by the throw of the lever to shift the carrier, and therewith the cradle, the chuck and the drill, bodily toward the grinder, and connections operated by the throw of the lever to rock the cradle and turn the chuck in coordination with the shift of the carrier; and such combination being characterized as follows: the cradle-rocking connection comprising a link connection from the lever to the cradle arranged to thrust or pull an eccentric part of the cradle toward or from the grinder thus to tilt the cradle, chuck and drill, during grinding, and the chuck-turning connection comprising a passive member or bar mounted on the carrier and engaging an eccentric point of the chuck to anchor such eccentric point so that the rocking of the cradle and chuck causes self-turning of the chuck and drill during grinding; whereby the drill while pressed against the grinder by the carrier is tilted by the cradle and turned by the chuck.

4. A drill grinding machine having a grinder wheel, a table in front of the grinder, and a mechanism for presenting the drill to the grinder, of the type comprising in combination a carrier slidable on the table rearwardly toward the grinder and having an upstanding bracket, a cradle carried upon the carrier bracket and pivoted at a high point to rock thereon about a substantially horizontal axis at 31° more or less to the grinding face, a chuck adapted to hold the drill and journaled on the cradle to turn on a substantially horizontal axis slanting to the grinding face at 59° more or less, an operating lever fulcrumed at the front of the table to swing horizontally, a connection operated by the throw of the lever to slide the carrier, and therewith the cradle, the chuck and the drill, rearwardly toward the grinder, a link connecting the lever to a low part of the cradle to thrust rearwardly thereon whereby the throw of the lever rocks the cradle to tilt downwardly the front of the cradle, chuck and drill, and an anchor device or bar extending between the carrier and a lateral point on the chuck operative to hold said point whereby the rocking of the cradle causes turning of the chuck and drill.

5. A drill grinding machine having a grinder wheel, a supporting table, and a mechanism for presenting the drill to the grinder, of the type comprising in combination a carrier shiftable on the table relatively toward and from the grinder, a cradle carried wholly upon the carrier and pivoted to rock thereon, a chuck adapted to hold the drill and journaled on the cradle to turn on an axis slanting to the grinding face at an angle determined by the cutting-edge-angle of the drill, such cradle and chuck axes being at substantial angles to each other, an operating lever or actuator, a connection operated by the throw of the lever to shift the carrier toward the grinder, and connections operated by the throw of the lever to rock the cradle and turn the chuck in coordination with the shift of the carrier; and such combination being characterized in that the chuck-turning connection consists of an anchor means operative passively to maintain a lateral point on the chuck at a given level or distance from the carrier whereby the rocking of the cradle brings about the turning or oscillation of the chuck and drill.

6. A drill grinding machine having a grinder wheel, a supporting table, and a mechanism for presenting the drill to the grinder, of the type comprising in combination a carrier shiftable on the table relatively toward and from the grinder, a cradle carried wholly upon the carrier and pivoted to rock thereon, a chuck adapted to hold the drill and journaled on the cradle to turn on an axis slanting to the grinding face at an angle determined by the cutting-edge-angle of the drill, such cradle and chuck axes being at substantial angles to each other, an operating lever or actuator, a connection operated by the throw of the lever to shift the carrier toward the grinder, and connections operated by the throw of the lever to rock the cradle and turn the chuck in coordination with the shift of the carrier; and such combination being characterized in that the cradle-rocking connection consists in a lengthwise-adjustable link pivoted directly to the lever and cradle, at an eccentric point of the latter and operating positively to thrust and pull thereon.

7. A drill grinding machine having a grinder wheel, a supporting table, and a mechanism for presenting the drill to the grinder, of the type comprising in combination a carrier shiftable on the table relatively toward and from the grinder, a cradle carried wholly upon the carrier and pivoted to rock thereon, a chuck adapted to hold the drill and journaled on the cradle to turn on an axis slanting to the grinding face at an angle determined by the cutting-edge-angle of the drill, such cradle and chuck axes being at substantial angles to each other, an operating lever or actuator, a connection operated by the throw of the lever to shift the carrier toward the grinder, and connections operated by the throw of the lever to rock the cradle and turn the chuck in coordination with the shift of the carrier; and such combination being characterized in that the chuck is journaled on the cradle by circular bearing members on each, surrounding the drill.

8. A drill grinding machine having a grinding wheel, a supporting table, and a mechanism for presenting the drill to the grinder, of the type comprising in combination a carrier shiftable on the table relatively toward and from the grinder, a cradle carried wholly upon the carrier and pivoted to rock thereon, a chuck adapted to hold the drill and journaled on the cradle to turn on an axis slanting to the grinding face at an angle determined by the cutting-edge-angle of the drill, such cradle and chuck axes being at substantial angles to each other, an operating lever or actuator, a connection operated by the throw of the lever to shift the carrier toward the grinder, and connections operated by the throw of the lever to rock the cradle and turn the chuck in coordination with the shift of the carrier; and such combination being characterized in that the chuck is journaled on the cradle by circular bearing members on each, surrounding the drill, and there being a concentric ring on the chuck through which the turning of the chuck is effected, the body of the chuck being adjustable rotatably in the ring, and means normally to couple the chuck body to the ring whereby the chuck turns with the ring during grinding, such coupling means being releasable to permit the chuck and drill to be rotatably adjusted in the ring after grinding one surface of the drill to set the drill for grinding another surface without releasing the drill from the chuck.

9. A drill grinding machine having a grinder wheel, a supporting table, and a mechanism for presenting the drill to the grinder, of the type comprising in combination a carrier shiftable on the table relatively toward and from the grinder, a cradle carried wholly upon the carrier and pivoted to rock thereon, a chuck adapted to hold the drill and journaled on the cradle to turn on an axis slanting to the grinding face at an angle determined by the cutting-edge-angle of the drill, such cradle and chuck axes being at substantial angles to each other, an operating lever or actuator, a connection operated by the throw of the lever to shift the carrier toward the grinder, and connections operated by the throw of the lever to rock the cradle and turn the chuck in coordination with the shift of the carrier; and such combination being characterized in that the chuck has associated with it a ring or collar through which the turning of the chuck is effected, and means to clutch and release the chuck to and from the ring, whereby the chuck may be released and adjustably turned for setting and resetting of the drill and reclutched to the ring.

10. A grinding machine as in claim 9 and wherein the connection for turning the chuck during grinding comprises a passive means or anchor to hold an eccentric point on said ring against tilting with the cradle whereby the rocking of the cradle compels the turning of the ring, chuck and drill thereon.

ROBERT C. WEISHAMPEL.